United States Patent
Tyrrell et al.

(10) Patent No.: US 8,675,636 B2
(45) Date of Patent: Mar. 18, 2014

(54) NODE IN A WIRELESS SYSTEM AND METHOD FOR TIME AND FREQUENCY SYNCHRONIZING NODES IN A WIRELESS SYSTEM

(75) Inventors: Alexander Tyrrell, Freising (DE); Gunther Auer, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 230 days.

(21) Appl. No.: 13/231,134

(22) Filed: Sep. 13, 2011

(65) Prior Publication Data

US 2012/0063447 A1    Mar. 15, 2012

(30) Foreign Application Priority Data

Sep. 13, 2010   (EP) ..................... 10176472

(51) Int. Cl.
    *H04J 3/06*         (2006.01)
(52) U.S. Cl.
    USPC .......................... 370/350; 455/502
(58) Field of Classification Search
    USPC ......................................... 370/350
    See application file for complete search history.

(56) References Cited

U.S. PATENT DOCUMENTS

| 7,860,205 B1 * | 12/2010 | Aweya et al. ................. 375/376 |
| 2004/0005902 A1 * | 1/2004 | Belcea ............................. 455/502 |
| 2006/0030343 A1 | 2/2006 | Ebner et al. |
| 2006/0198355 A1 | 9/2006 | Hagiwara |
| 2008/0279173 A1 | 11/2008 | Zhang et al. |
| 2009/0279531 A1 | 11/2009 | Costa et al. |

FOREIGN PATENT DOCUMENTS

| EP | 0661836 A1 | 7/1995 |
| EP | 1717970 A2 | 11/2006 |
| EP | 1852998 A1 | 11/2007 |
| EP | 1976164 A2 | 10/2008 |
| EP | 2 299 761 A | 3/2011 |
| JP | 2001-156743 A | 6/2001 |
| JP | 2006-086760 A | 3/2006 |
| JP | 2010-041712 A | 2/2010 |
| JP | 2010-041713 A | 2/2010 |

OTHER PUBLICATIONS

Search Report in European Application No. 10 176 472.8, dated Mar. 22, 2011, 8 pages.
Office Action in European Application No. 10 176 472.8, dated Nov. 14, 2011, 6 pages.
Berger, Stefan et al., "Impact of Local-Oscillator Imperfections on Nonregenerative TDD and FDD Relaying," *IEEE*, 2010, 6 pages.

(Continued)

*Primary Examiner* — Huy D Vu
*Assistant Examiner* — Kevin Cunningham
(74) *Attorney, Agent, or Firm* — Brinks Gilson & Lione

(57) ABSTRACT

A node in a wireless system using transmit/receive slots for a communication among the nodes in the wireless system comprises a reception block configured to receive from a transmitting node in the wireless system a synchronization signal, and to derive from the synchronization signal a time offset and a frequency offset between the clock generators in the node and in the transmitting node. Further, a slot synchronization block is provided including the clock generator which is updated based on the derived time offset and the derived frequency offset. Further, a transmission block is provided for transmitting data. The slot synchronization block sets a slot start of a slot based on the derived time offset and sets a slot of a subsequent slot based on the derived frequency offset.

17 Claims, 6 Drawing Sheets

(56) References Cited

OTHER PUBLICATIONS

Ebner, André et al., "Decentralized Slot Synchronization in Highly Dynamic Ad Hoc Networks," *WPMC The Fifth International Symposium on Wireless Personal Multimedia Communications*, Oct. 27-30, 2002, vol. 2, pp. 494-498.

Ebner, André et al., "Synchronization in Ad Hoc Networks Based on UTRA TDD," *Proc. of the IEEE PIMRC*, 2002, pp. 15-18.

Lewandowski, Wlodzimierz et al., Precision and Accuracy of GPS Time Transfer, *IEEE Transactions on Instrumentation and Measurement*, vol. 42, No. 2, Apr. 1993, pp. 474-479.

Tang, Zhenyu et al., "Hop-Reservation Multiple Access (HRMA) for Ad-Hoc Networks," *INFOCOM '99, Eighteenth Annual Joint Conference of the IEEE Computer and Communications Society*, Mar. 21-25, 1999, vol. 1, pp. 194-201.

Tyrrell, Alexander et al., "Emergent Slot Synchronization in Wireless Network," IEEE Transactions on Mobile Computing, vol. 9, No. 5, May 2010, pp. 719-732.

Zhou, Dong et al., "An Accurate and Scalable Clock Synchronization Protocol for IEEE 802.11-Based Multihop Ad Hoc Networks," *IEEE Transactions on Parallel and Distributed Systems*, vol. 18, No. 12, Dec. 2007, pp. 1797-1808.

\* cited by examiner

NODE IN A WIRELESS SYSTEM AND METHOD FOR TIME AND FREQUENCY SYNCHRONIZING NODES IN A WIRELESS SYSTEM

RELATED APPLICATIONS

This application claims priority under 35 U.S.C. §119 to European Patent Application No. 10176472.8 filed on Sep. 13, 2010, the entire content of which is hereby incorporated by reference.

BACKGROUND OF THE INVENTION

Embodiments of the invention relate to the field of network synchronization, and in particular to the field of decentralized network synchronization. Embodiments of the invention concern the frequency synchronization in such networks.

In recent years many everyday items have gained wireless capabilities so that wireless communication among electronic devices becomes more and more popular and common. One approach for such wireless communication among electronic devices is to organize the devices in an ad hoc network or in a peer-to-peer network, i.e. a decentralized network.

FIG. 1 shows a schematic representation of an ad hoc network formed by a plurality of wireless devices MS that directly communicate with each other as indicated by the arrows. The ad hoc network is set up in such a way that some of the wireless devices MS directly communicate with each other while the communication between distant wireless devices MS like wireless devices 100 and 102 occurs via intermediate wireless devices. The wireless devices may be mobile stations or PDAs having a wireless communication capability or any other electronic device allowing for a wireless communication with its environment. The wireless devices shown in FIG. 1 are also referred to as the "nodes" of the wireless network.

In such a network synchronization of the communication among the respective devices is required. Synchronization schemes known in the art assume that nodes form a fully meshed network, which can be true in a wireless network. However, in general this assumption does not hold for two reasons. First, when considering that nodes are spread over a large area or have low transmission power, a node can only communicate with nodes which are within its transmission range, i.e. with neighboring nodes, as mentioned above with regard to FIG. 1. Further, for communications between nodes in a peer-to-peer fashion, a fully meshed network requires nodes to transmit with very high power, which may not always be possible when nodes are very far apart and also causes high interference, so that that it is preferable to lower transmission power. Thus, in many cases the topology of a wireless network as shown in FIG. 1 is not a fully meshed one. Two devices in the network, like the electronic devices 100 and 102 are not necessarily within transmission range, but they communicate by using neighboring nodes, thus forming a multi-hop network.

Prior art approaches suggest a time synchronization in such a network in a distributed fashion. Time synchronization is defined as aligning local time units in order to define a common slot structure among all nodes. Basically, the slot synchronization among the respective wireless devices MS is advantageous as it enables synchronous multicast services and coordinated multipoint (CoMP) schemes. Further, the design of interference management algorithms may be simplified because synchronization is a basic form of coordination.

The network shown in FIG. 1 can be considered a network of femtocells and each femtocell is typically equipped with a cheap local oscillator having a poor clock quality. A clock signal from a macrocell may be difficult to obtain indoors, so that, in accordance with known approaches, the synchronization is performed among the femtocells. However, clock generators and the clocks provided by them are inherently imperfect, i.e. there is no clock that can maintain a perfect track of time and frequency over time. Clock generators and their characteristics thus change over time, however, their characteristics also fluctuate when environmental conditions vary, for example, the temperature. This leads to clock jitter in time and in frequency, so that clocks need to be periodically re-synchronized. This problem is even more severe in the above described femto networks using low-quality clock generators the characteristics of which will change more rapidly than the characteristics of high-quality clock generators. However, it has to be mentioned even in case of high-quality clock generators that there is no perfect clock.

In the art various forms of network synchronizations have been proposed, which typically rely on a master-slave type of architecture. A master clock dictates its timing and frequency to the slave clock. This solution requires a very high clock quality for the master, however, is prone to single points of failure because the slave clock completely depends on the master clock.

An alternative known approach is to perform synchronization in a decentralized manner. In such a scenario each node updates its clock based on the detected neighboring clock and in return it influences also its neighbors. Therefore, in such approaches local update rules need to be designed that lead to the synchronization of the network. Decentralized network synchronization solutions have been proposed. Based on the theory of pulse-covered oscillators, a solution described by Tyrrell, A.; Auer, G. and Bettstetter, C. an "Emergent Slot Synchronization in Wireless Networks", IEEE Transactions on Mobile Computing, 2010, vol. 9, pp. 719-732, and also described in EP 1 852 998 A1 focuses on time synchronization. This known approach applies a biologically inspired technique to perform a decentralized slot synchronization in wireless networks. In accordance with this known approach each node maintains a phase function $\phi_i(t)$, which varies at a given frequency $\phi_i(t)/dt=1/T$. The phase of the clock is updated when a packet is received, based on the detected timing of packets $\hat{\tau}_{ij}$. However, in accordance with this approach only time synchronization is provided so that the also existing frequency offsets of the oscillators used are not addressed.

Another known solution is described by Ebner, A.; Rohling, H.; Halfmann, R. and Lott, M. "Synchronization in ad hoc networks based on UTRA TTD" Proceedings IEEE International Symposium on Personal, Indoor and Mobile Radio Communications (PIMRC), 2002. This approach is targeted at UMTS vehicular communications, however, it requires to first perform a time synchronization before performing the task of frequency synchronization. More specifically, in a first step a coarse or one-shot time synchronization is performed using GPS (GPS=Global Positioning System). Following this, a fine time synchronization is performed. Only once these two steps for time synchronization are completed a coarse frequency synchronization followed by a fine frequency synchronization is carried out. However, this approach requires to first perform the time synchronization before performing the frequency synchronization, that is without the first step this approach cannot cope with any initial timing misalignment. In addition, time synchronization is performed using GPS which is not available indoor for femtocells. Further, using the GPS approach already guarantees a time synchronization precision of microseconds that can also be used for frequency synchronization as GPS clocks are very accurate, as is described by Lewandowski, W.; Petit, G. and Thomas, C. "Precision and accuracy of GPS time transfer" IEEE Transactions on Instrumentation and Measurement, 1993, vol. 42, pp. 474-479.

With regard to FIG. 2, the problems of a missing frequency synchronization in decentralized networks as is, for example, shown in FIG. 1, will be explained in further detail. FIG. 2 shows, as an example, the transmission slots of three nodes, namely node 1, node 2 and node 3 of a network as is shown in FIG. 1. Naturally, such a network comprises either more or less nodes and the diagram of FIG. 2 is a schematic diagram for discussing the problems of a missing frequency synchronization in such networks. In the nodes the start and duration of a slot are given by the slot clock $\phi_i(t)$. Upon receiving a synchronization word the start time of a slot at which $\phi_i(t)=0$ is set to the same point of time in all nodes, and the duration of a slot within a node is given by the clock generator frequency that is defined as $$f_i = \frac{d\phi_i(t)}{dt} = \frac{1}{T_i}.$$

In FIG. 2, at time $t_0$ a synchronization word S is received at each of nodes 1, 2 and 3. On the basis of the synchronization word or the synchronization signal S, the start of a slot for each node is readjusted. The synchronization word S is received periodically, for example, in accordance with one known standard after five slots for readjusting the start of the slots again. Thus, time synchronization results in a common starting point in time, namely point $t_0$ at which in each node the first slot starts. As mentioned above, the duration of the slots is given by the frequency of the local clock generator. As can be seen, nodes 1, 2 and 3 have a duration for each slot of $T_1$, $T_2$ and $T_3$, respectively. However, the frequencies of the respective clock generators are not synchronized, i.e. each clock generator operates on its own frequency, so that, as can be seen from FIG. 2, node 1 has a first slot duration $T_1$ that is longer than the slot duration $T_2$ of node 2, however, shorter than the slot duration $T_3$ of node 3. Thus, the slot of node 2 ends first at time $T_1$. The slot of node 1 ends second at time $T_2$. The longest slot is the one of node 3 that ends last at time $T_3$. Thus, following the receipt of the time synchronization S after the first slot, the start times of the following slots are no longer aligned, rather, as can be seen they spread over time, i.e. there is an offset of $t_2-t_1$ between the start of the second slot of node 2 and the start of the second slot of node 1. Also, there is an offset, of $t_3-t_1$ between the start of a second slot of node 2 and a second slot of node 3. The maximum offset between the shortest slot, the slot of node 2 and the longest slot, the slot of node 3 is indicated in FIG. 2 as $O_1$. Due to this offset between the respective nodes, the starting times of the subsequent slots are no longer aligned, so that without frequency synchronization the spread in slot starts increases over time. This can be seen from FIG. 2 showing the offset between the shortest slot, the slot of node 2 and the longest slot, the slot of node 3, after five slots. This is indicated in FIG. 2 at $O_2$. As can be seen, this offset increases dramatically. Actually, in this scenario node 2 already processed five slots while node 3 only processed four slots.

Thus, in case the nodes are not frequency synchronized, the slot length varies, that is the start of subsequent slots diverges over time.

SUMMARY OF THE INVENTION

It is an object of the invention to provide an improved synchronization scheme for a wireless network reducing or avoiding slot length variations among slots of nodes in wireless networks.

This object is achieved by a node in accordance with claim 1 and by a method in accordance with claim 11.

Embodiments of the invention provide a node in a wireless system, the wireless system using transmit/receive slots for a communication among the nodes in the wireless system, the node comprising:

a reception block, the reception block being configured to receive from a transmitting node in the wireless system a synchronization signal, and to derive from the synchronization signal a time offset and a frequency offset, between clock generators in the node and in the transmitting node;

a slot synchronization block including the clock generator, the slot synchronization block being configured to update the clock generator based on the derived time offset and the derived frequency offset, and a transmission block configured to transmit data, wherein the slot synchronization block is configured to set a slot start of a slot based on the derived offset and to set a slot start of a subsequent slot based on the derived frequency offset.

Embodiments of the invention provide a method for time and frequency synchronizing nodes in a wireless system, the wireless system using transmit/receive slots for a communication among the nodes of the wireless system, the method comprising:

receiving at a receiving node from a transmitting node in the wireless system a synchronization signal;

deriving from the synchronization signal a time offset and a frequency offset between clock generators in the receiving node and in the transmitting node; and updating the clock generator of the receiving node based on the derived time offset and the derived frequency offset, wherein a slot start of a slot is set based on the derived time offset, and a slot start of a subsequent slot is set based on the derived frequency offset.

In accordance with embodiments, the clock generator includes a digital oscillator and the slot synchronization block is configured to modify the phase of the clock signal of a digital oscillator by updating the clock generator. In such an embodiment the clock synchronization block may further be configured to modify the phase of the clock signal of the digital oscillator by delaying incrementing the phase in accordance with the time offset to provide for the time synchronization, and to change a slope of the phase in accordance with the frequency offset to provide for the frequency synchronization.

In accordance with embodiments of the invention, the slot synchronization block may be configured to set the slot start of a slot based on the derived time offset every predefined number of slots, and to set the slot start of the other slots based on the derived frequency offset. For example, in accordance with a standard or a protocol time synchronization may occur every five slots, while the frequency synchronization occurs after the first slot, after the second slot, after the third slot and after the fourth slot. In accordance with other standards, a different number of slots may be used, for example, the number may be more than five slots or less than five slots, for example, it may be between 10 and 100.

In accordance with further embodiments, the reception block may be configured to derive the frequency offset on the basis of frequency information about the clock generator of the transmitting node in the synchronization signal.

In accordance with another embodiment the synchronization signal may comprise a plurality of portions received subsequently at the node, wherein the reception block may then be configured to derive the frequency offset from the subsequent portions of the synchronization signal. The synchronization signal may be a synchronization word and the frequency offset may be derived from the receipt of two subsequent synchronization words at the node.

In accordance with another embodiment of the invention the slot synchronization block may be configured to update the clock generator by correcting the frequency of the clock generator by a correction term calculated by an existing correction term and an upgrade function receiving the frequency offset as an input, wherein the input function defines a frequency to which the clock generator and the wireless system converges.

In accordance with an embodiment of the invention, also a computer program product is provided that stores program codes on a machine-readable carrier for performing the inventive method when being executed on a computer on a node of the wireless system.

Thus, embodiments of the invention provide an approach combating clock imperfections due to clocks varying over time and over environmental changes and provide for a synchronization of local oscillators, wherein the frequency synchronization of running local slot clocks in the network is done in a completely decentralized manner by updating the clocks based on local frequency offsets. Thus, a solution for a decentralized frequency slot synchronization in wireless networks is provided which, in accordance with embodiments, is particularly suited for femtocell networks, where synchronizations through sniffing a macrocell network may be impossible or difficult. The approach in accordance with embodiments addresses the above described problems of frequency synchronization of the slot clock which determines the beginning and end of time slotted transmissions. Local rules for achieving frequency synchronization in a decentralized manner are described. In accordance with embodiments of the invention, the frequency offset that is calculated on the basis of a received signal, like the synchronization signal, is used to update the running frequency of an internal slot clock, whereas in accordance with the approach of embodiments of the invention time and frequency synchronization of the slot clocks are performed jointly.

When compared to conventional approaches, embodiments of the invention provide a plurality of advantages, e.g.:
- the frequency synchronization is performed simultaneously with the time synchronization, i.e. not consecutively,
- no additional overhead is required, as an existing synchronization sequence used for time synchronization is also sufficient for providing the necessary information for frequency synchronization,
- performing the frequency synchronization diminishes the required periodicity of re-synchronization as clocks are more stable over time,
- synchronization is reached for any initial frequency offset,
- the synchronization is reached quicker overall, as both time and frequency synchronization tasks are completed jointly;
- compared to the prior art approaches described above, both time and frequency synchronization are performed faster and in a simpler manner,
- the synchronization is reached in an autonomous manner and does not rely on any external timing source.

Further advantages of the approach of embodiments of the invention are that the frequency slot synchronization is performed utilizing the frequency offset obtained from the link-level synchronization to update the clock. Further, the frequency synchronization is performed in a step-by-step manner so that no predefined protocol on the transmission is needed. The shape of any updating function can be chosen from a variety of functions, whilst synchronization is still guaranteed. In one example the measuring of the frequency of the slot clock can be done based on two consecutive transmissions of the synchronization signal or synchronization word (sync word).

BRIEF DESCRIPTION OF THE DRAWINGS

In the following, embodiments of the invention will be described with respect to the accompanying drawings, in which.

DETAILED DESCRIPTION OF THE PREFERRED EMBODIMENTS

In the subsequent description of embodiments of the invention same or similar elements will be denoted by the same reference signs.

Figure 1:
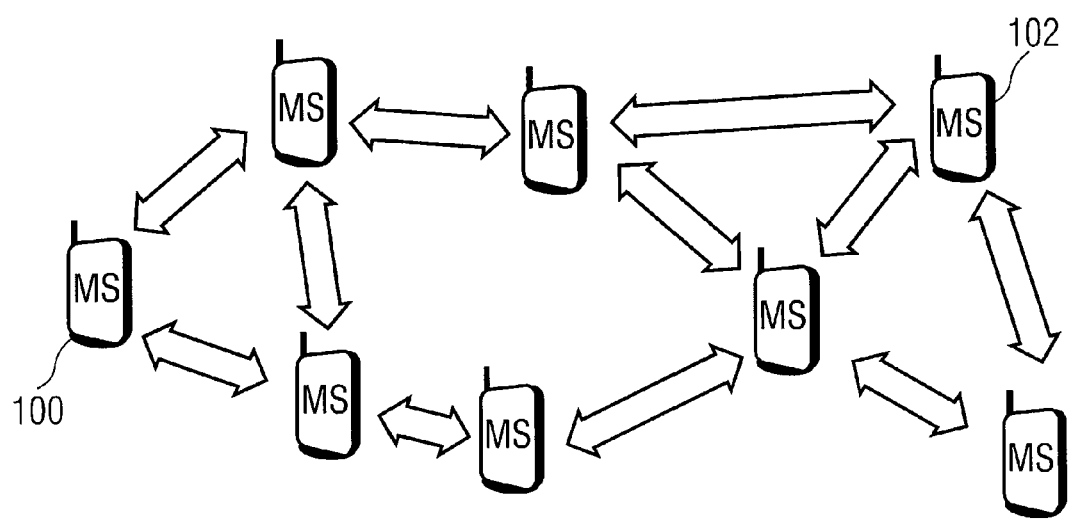
FIG. 1 shows a schematic representation of an ad hoc network formed by a plurality of wireless devices MS.
Figure 2:
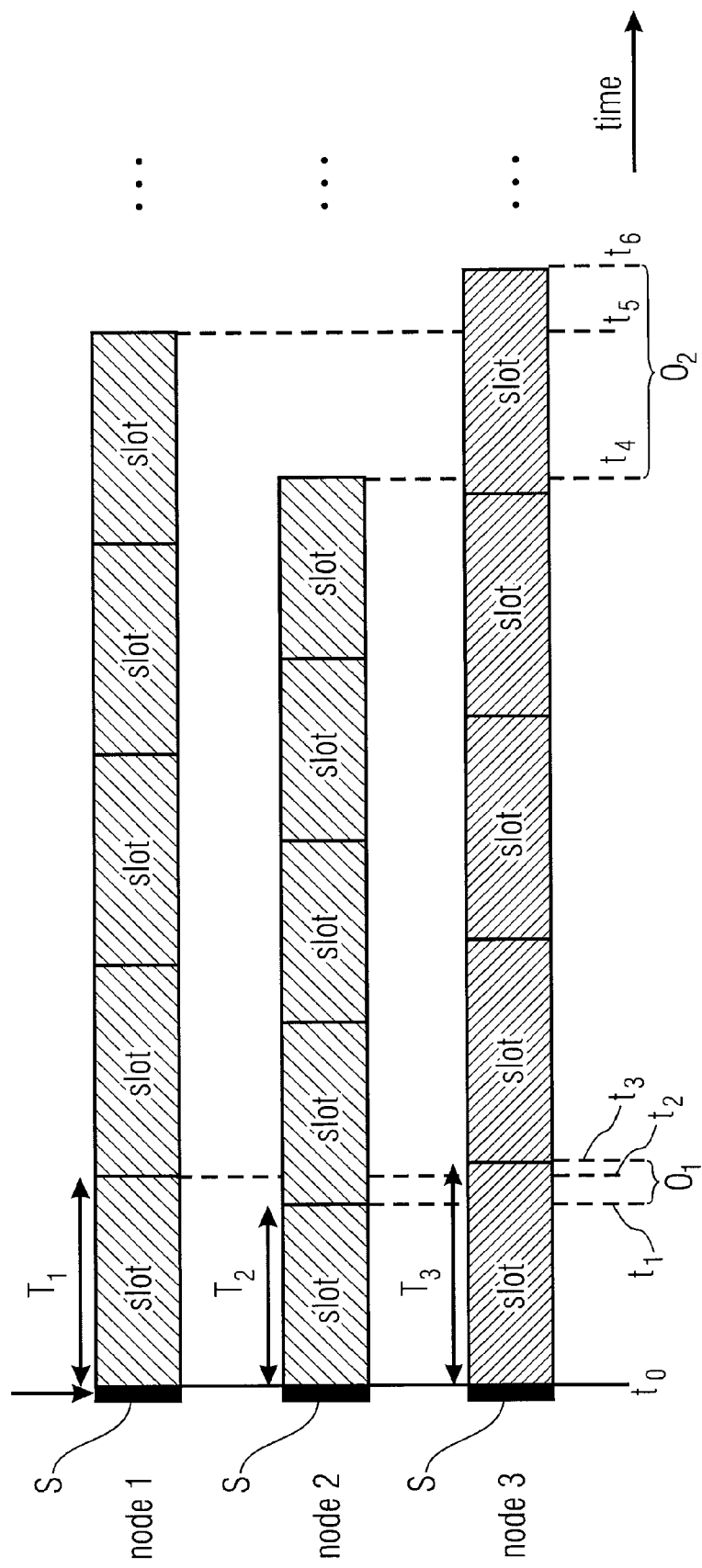
FIG. 2 is a diagram illustrating the problems of a missing frequency synchronization in decentralized networks as shown in FIG. 1.
Figure 3:
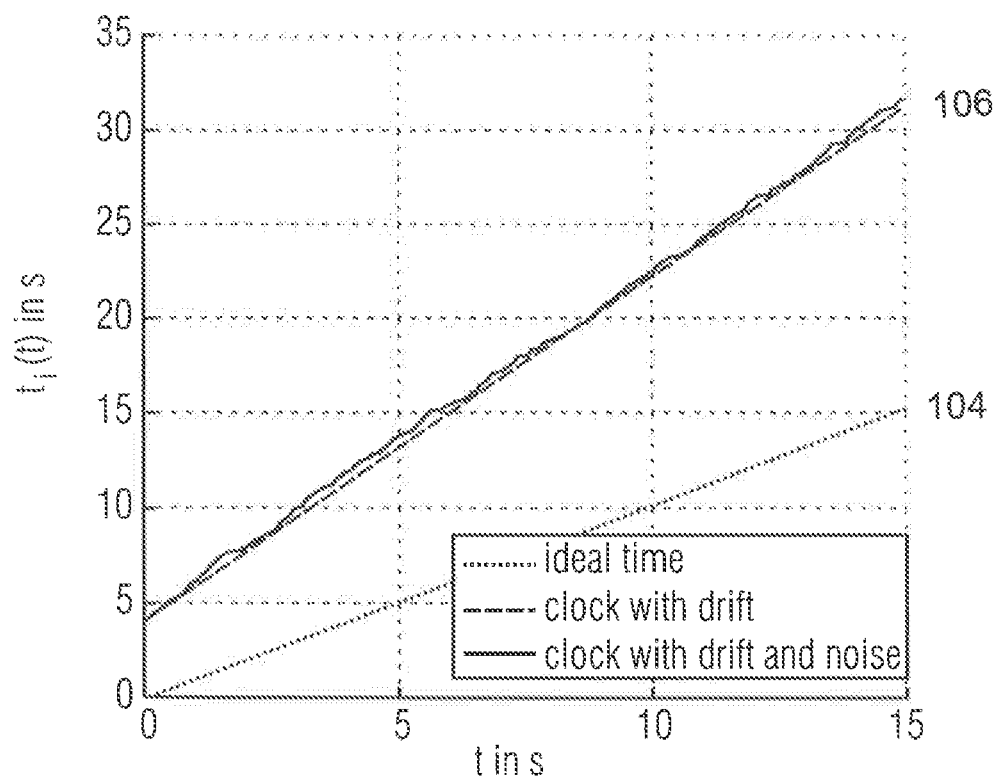
FIG. 3 illustrates the evolution of a time t of an imperfect clock $t_i(t)$ that is subject clock drift (the slope of the clock process) and clock noise.

Prior to describing embodiments of the invention in further detail, reference is made to FIG. 3 illustrating the evolution of a time t of an imperfect clock $t_i(t)$ that is subject clock drift (the slope of the clock process) and clock noise. In FIG. 3 the ideal time is shown as line 104. As can be seen, for the ideal local oscillator the perfect clock of the local oscillator corresponds to the desired time in seconds, e.g. after five seconds also the clock $t_i(t)$ indicates five seconds. However, no clock is perfect as a clock timing offset corrupts the time counter and the clock drift corrupts the frequency which requires the periodic synchronization of the oscillator. As can be seen from the lines 106 representing the imperfect time due to the offset and drift, the desired time does not correspond to the time indicated by the clock. For example, as can be seen from a comparison of lines 104 and 106 after five seconds the oscillator will actually indicate a time between 13 and 14 seconds, and the offset will increase as can be seen from the steeper slope of the lines 106 when compared to line 104. At a time that should be fifteen seconds after the start the oscillator actually indicates a time of more than 30 seconds. Embodiments of the invention avoid such a clock offset and clock drift by the joint time and frequency synchronization. The time synchronization adjusts the value of the clock, and in case of a slot synchronization the time is divided into slots of constant length and the nodes, as described above with regard to FIG. 2, agree on the slot start and slot end, wherein the slot start is synchronized using the sync word. The frequency synchronization adjusts the slope of the clock in order to compensate for the clock drift. By means of the measures of time and frequency synchronization the actual behavior of the local oscillator (see lines 106 in FIG. 3) is adjusted in such a way that it matches or is at least as close as possible to the ideal behavior shown at 104 in FIG. 3.

Figure 4:
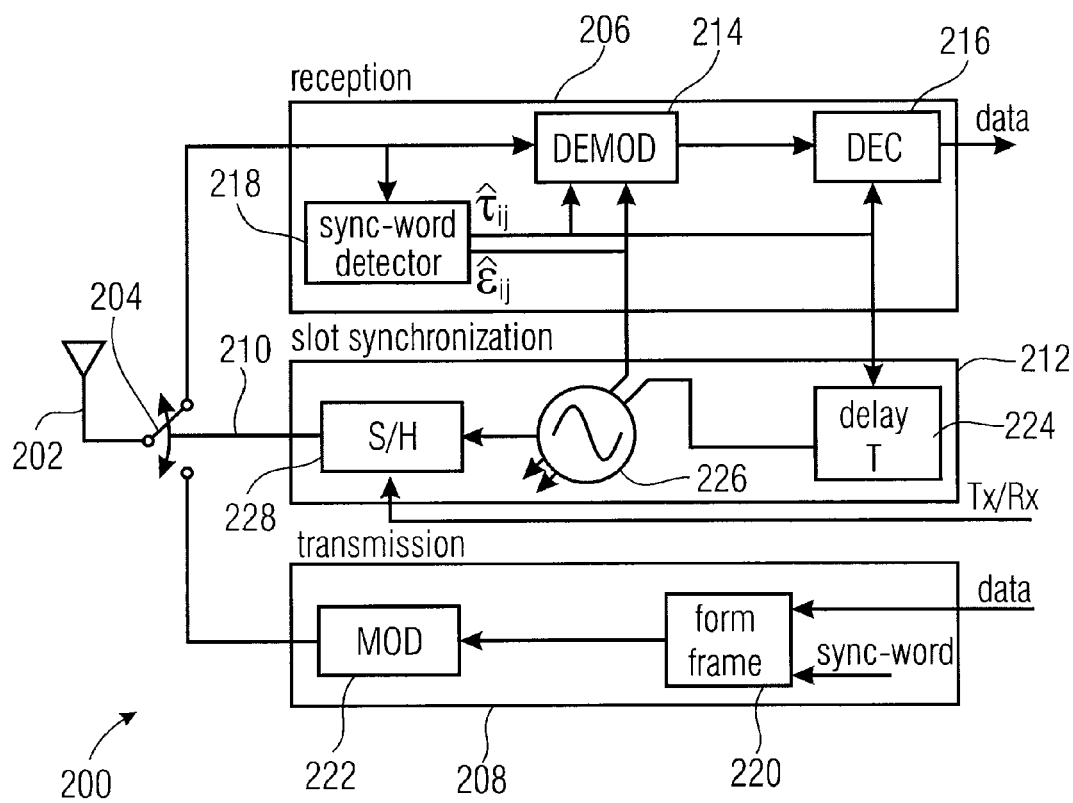
FIG. 4 is a schematic block diagram of a node in a wireless.

FIG. 4 shows a schematic block diagram of a node in a network as it is for example shown in FIG. 2. In FIG. 2 the node 200 may be a mobile station of a cellular telephone network, or a PDA device or any other electronic device having wireless capabilities. The node 200 comprises an antenna 202 for receiving/transmitting signals between the node 200 and other nodes in the network. A switch 204, for example a duplexer is provided for selectively connecting the antenna to either a reception block 206 or to a transmission block 208. The switch 204 is controlled by a signal received via a control line 210 that is provided by a slot synchronization block 212. The reception block 206 comprises a demodulator 214, a decoder 116 and a synchronization word detector 218. The transmission block 208 comprises a frame generator 220 and a modulator 222. The slot synchronization block 212 comprises a delay element 224, a local oscillator 226 and a sample/hold-circuit 228.

In the reception block 206 the incoming baseband signal from the antenna 202 is passed to the demodulation unit 214 where downconversion, sampling and matched filtering are applied to the signal. Further, the baseband signal is applied to the synchronization word detector 218 that detects a synchronization word, if present, in the baseband signal and derives from the synchronization word the timing and frequency offsets between the transmitting node and the receiving node 200, the timing offset said being denoted by $\hat{\tau}_{ij}$, and the frequency offset being denoted by $\hat{\epsilon}_{ij}$. The timing and frequency offsets are applied to the demodulator 214, and the demodulated signal is applied to the decoder 214 decoding the data from the received signal and outputting the data for further processing in other elements of the node which are not depicted in the figure. The slot synchronization block 212 comprises the local oscillator 226 providing the slot clock. The slot clock is updated on the basis of the detected time and frequency offset $\hat{\tau}_{ij}$ and $\hat{\epsilon}_{ij}$. The frequency offset $\hat{\epsilon}_{ij}$ detected by the synchronization word detector 218 is not only applied to the demodulator 214 of the reception block 206 but also to the local oscillator 226 of the slot synchronization block 212. The timing offset $\hat{\tau}_{ij}$ detected by the synchronization word detector 218 is not only provided to the demodulator 214 and to the decoder 216 of the reception block 206 but also to the delay element 224 of the slot synchronization block 212. For time synchronization known rules may be used, for example rules similar to the ones described in EP 1 852 998 A1. A start of a transmission may be delayed by T seconds before a discrete increment of the clock phase is applied. The delay element 224 outputs the delay signal to the local oscillator 226 which will be delayed in accordance with the above mentioned rules before putting a signal to the sample/hold-circuit 228 which receives a further input signal indicating whether a transmission mode or a reception mode is desired. This signal is applied via the control line Tx/Rx. The output signal from the sample/hold-circuit 228 is the control signal on line 210 for switching the switch 204 either to the reception block 206 or to the transmission block 208, thereby connecting the antenna with the respective block. The rules for frequency synchronization will be described in further detail below. Based on the slot clock provided by the local oscillator 206 and the Tx/Rx signal coming from a scheduler of the node, the transmit and receive slots are determined.

The transmission block 208 becomes active when data is available for transmission. The transmission block 208 receives the data signal via the line data and also a synchronization word via the line sync word. The data is multiplexed together with the sync word in the form frame unit 220 wherein, in accordance with embodiments of the invention, the syncword is common to all nodes in the network and is the one that is utilized by the sync word detector 218 in the reception block 206 of a node. Once the transmit frame is formed it passes through the modulator unit 222 where it is modulated and upconverted before transmission via the antenna 202.

In accordance with embodiments of the invention, known slot synchronization scheme, like the ones described in EP 1 852 998 A1 are extended. In accordance with embodiments of the invention a measured frequency offset is utilized to update the running frequency of the internal slot clock provided by the local oscillator 226 so that in accordance with the approach of embodiments of the invention the frequency synchronization is jointly performed with the time synchronization. In accordance with the approach of embodiments of the invention, the frequency of the slot oscillator 226 is updated and in accordance with an embodiment of the invention the frequency of the oscillator is described by the first derivative of the phase function, which ideally is equal to a constant 1/T, also termed the nominal frequency $f_n=1/T$. The drift of the internal clock provided by the local oscillator 226 is denoted as $f_i(t)$. This drifts corrupts the ideal internal clock, and by means of the approach of embodiments of the invention the local clocks of all nodes in the network are iteratively updated based on the received signals so that all clocks in the network agree on a common frequency. Upon reception of a packet via the antenna 202 at a node at a time instance t, the oscillator frequency is updated by a correction term $f_{c,i}(t)$, as follows:

$$f_i(t) = \frac{d\phi_i(t)}{dt} = f_n + f_{d,i}(t) + f_{c,i}(t)$$

where:

$\frac{d\phi_i(t)}{dt}$: frequency of clock $i$ $f_n$: nominal frequency $f_{d,i}(t)$: frequency drift $f_{c,i}(t)$: frequency correction The correction term $f_{c,i}(t)$ is updated each time a packet is received, and is calculated based on the estimated local offset:

$$f_{c,i}(t^+) = f_{c,i}(t) + \gamma \cdot g(\hat{\epsilon}_{ij})$$

where $t^+$ denotes a short time instant, for example a time instant 1 µs after receipt of the packet including the sync word at time t. Naturally, other time differences may be used, for example the time difference may be in the range of the increment step of the digital oscillator, i.e. a digital oscillator divides the slot duration T into a number of steps, in the range 100-1000.

The factor $\gamma$ is a scalar coupling factor which may be the same for all nodes, and g is an update function. Different forms of the update function g may be used, for example, a simple averaging can be applied, e.g. using a first order filter ($g(x)=x$), or more sophisticated functions that include a forgetting factor may be applied. Using the averaging function will average all or a subset of the previously derived frequency offsets thereby yielding a convergence towards an average frequency of clock generators in the wireless system. The function including the forgetting factor considers only a subset of previously derived frequency offsets. Also, based on this update function nodes in a network converge to the average frequency of all oscillators. In another embodiment the update function may be a min/max function selecting for the update of the correction term a minimum or a maximum of the previously derived frequency offsets. This yields a fast convergence towards the frequency of that clock generator in the wireless system that has the minimum frequency or the maximum frequency.

The scalar coupling factor of the scalar function is used to weigh the update function, wherein the scalar function or scalar coupling factor is selected based on a desired time to convergence or based on a topology of the wireless system. The local oscillator as used in the nodes may be digital oscillators as mentioned above, and a slot synchronization block determines the frequency of the clock generator according to the above mentioned equation and sets a slope of a phase signal of the digital oscillator of the clock generator in accordance with the determined frequency. The scalar factor $\gamma$ has a value between 0 and 1, and is selected to trade-off between fast convergence ($\gamma$ close to 1), and stability of the synchronization ($\gamma$ close to 0).

Figure 5:
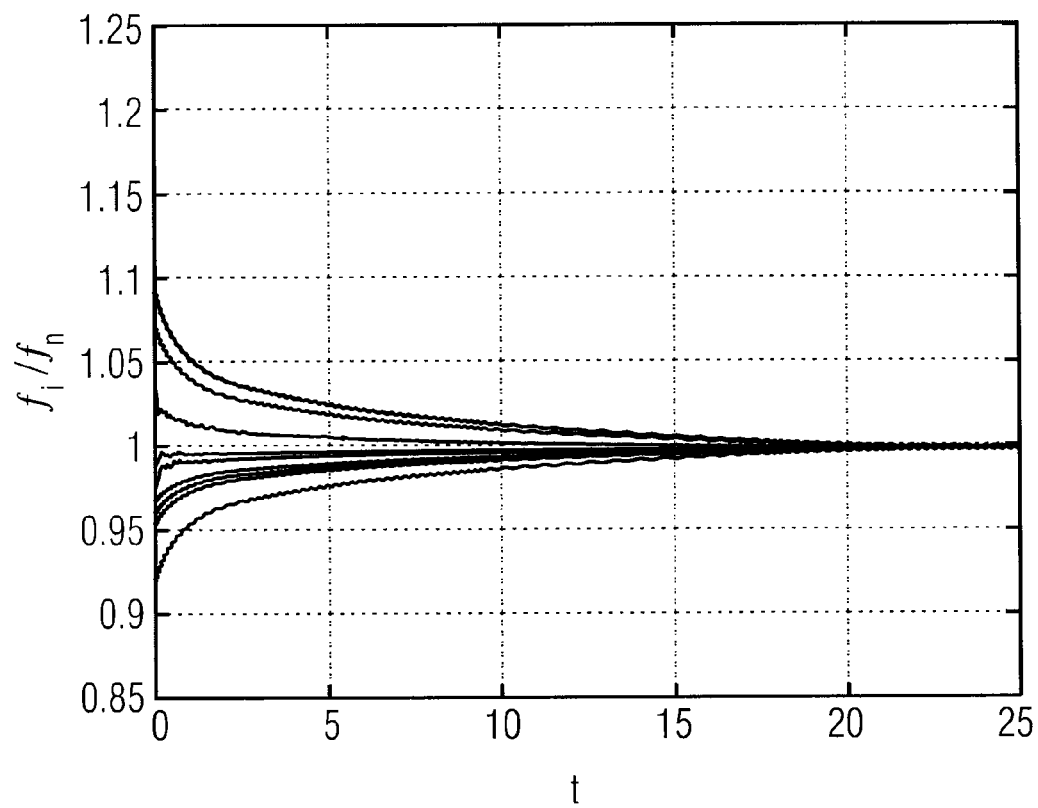
FIG. 5 is a diagram showing the evolution over time t of the local frequencies of 15 clocks.

FIG. 5 shows a diagram showing the evolution over time t of the local frequencies of 15 clocks. As can be seen, due to the approach of embodiments of the invention the frequencies of the local oscillators synchronize quite rapidly.

Figure 6:
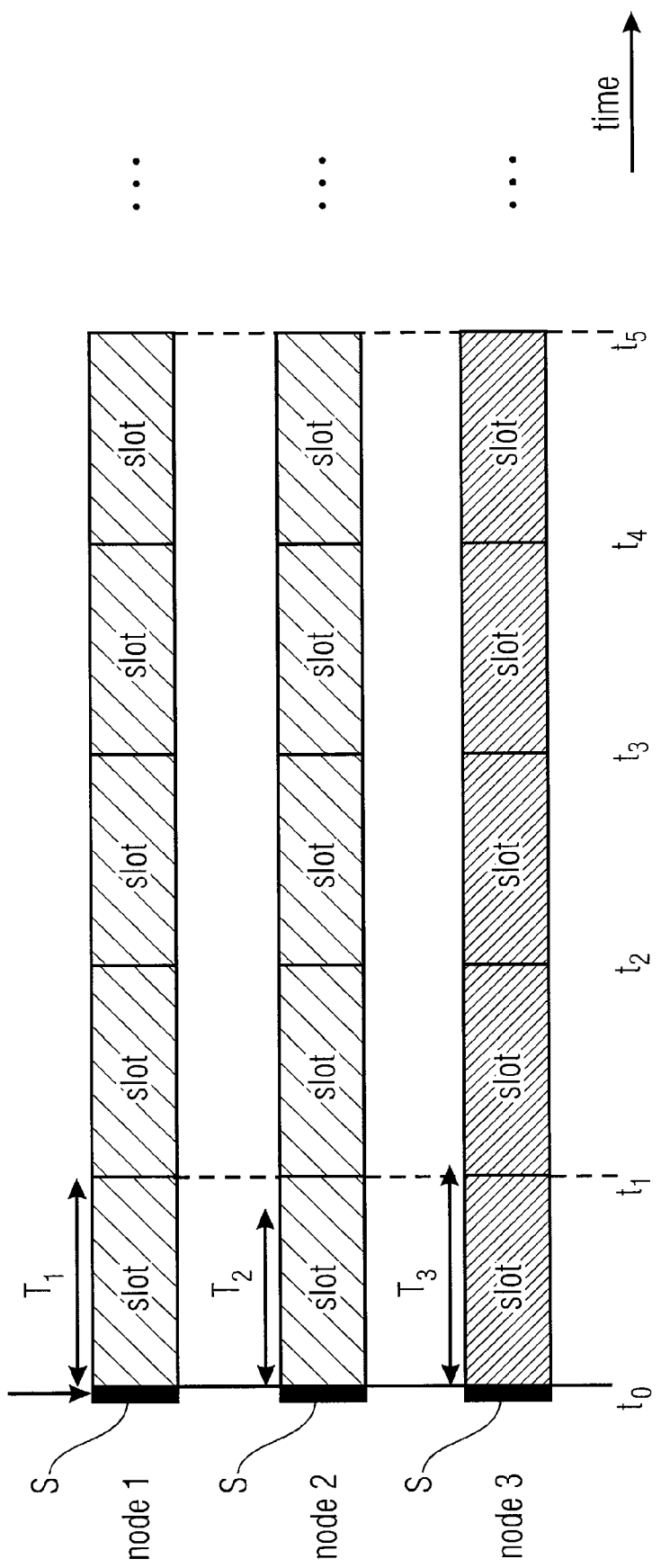
FIG. 6 is a diagram similar to FIG. 2 illustrating the results applying a frequency synchronization in accordance with embodiments of the invention.

FIG. 6 is an illustration similar to FIG. 2, however, the results of the approach of embodiments of the invention, namely the frequency synchronization, can be seen here. In a similar manner as depicted in FIG. 2, at a time instance $t_0$ a synchronization word S is received at the nodes 1, 2 and 3. From the synchronization word the time offset $\hat{\tau}_{ij}$ and the frequency offset $\hat{\epsilon}_{ij}$ are derived as described in FIG. 4, and in accordance with one embodiment at the time $t_0$ at least the start time of the slots is synchronized on the basis of $\hat{\tau}_{ij}$. In accordance with embodiments at the time $t_0$ only the starting time of the slots may be adjusted, however, in other embodiments at the time $t_0$ also the frequency may be adjusted on the basis of the derived frequency offset $\hat{\epsilon}_{ij}$. As to whether only the start of the slots or both the start and the duration of the slots, i.e. the frequency of the local oscillator, is set depends on the specifics of the wireless network in which the respective nodes are arranged. In either case, for the first slot it is assumed that the durations $T_1$ to $T_3$ are substantially the same so that the three first slots terminate at time $t_1$. In accordance with an embodiment, at time $t_1$ again, a frequency synchronization on the basis of the frequency offset derived from the synchronization word S is performed, thereby ensuring that the slot length of the subsequent slot, the respective second slots is also the same for all three nodes or at least substantially the same. The frequency synchronization may be performed at the end of each slot/at the beginning of each subsequent slot, i.e. at the instances $t_2$, $t_3$, $t_4$ and $t_5$. However, the approach of embodiments of the invention is not limited to this scheme, rather dependent on the specifics of the respective nodes and the quality of the local oscillators known from the respective data sheets of the oscillators it may be not necessary to synchronize or update the frequency of a local oscillator in each node 1, 2 and 3 at each instance of time indicated in FIG. 6. Rather, it may be sufficient to perform the frequency synchronization only every second or in every third slot, for example at time instance $t_2$ or time instance $t_3$ provided the stability of the oscillator used in the respective node is sufficient to maintain the constant slot lengths over the required time in accordance with a specified tolerance. Also, different frequency synchronization instances may be applied to different nodes dependent on the quality and the reliability of the oscillators used. For example, node 1 may be updated with regard to the frequency every time instance $t_1$, $t_2$, $t_3$, $t_4$ and $t_5$ while node 2 is only updated every second instance in time, i.e. at instance $t_2$ and $t_4$. In such a case, assuming that following instance $t_5$ a new synchronization word S is received by all nodes, in node 2 only the setting of the start time would be adjusted, however, no frequency synchronization would be done here, as in accordance with the reliability of the local oscillator the next frequency synchronization is deemed to be necessary only at instance $t_6$, i.e. following the first slot after having received the second synchronization word in FIG. 6 (not shown). Node 3 may comprise an even more reliable local oscillator requiring an update of the frequency or frequency synchronization only after each third slot, i.e. at instant $t_3$. Then, in a similar manner as for node 2, upon receiving the following or subsequent synchronization work only the update of the start of the next slot at instance $t_5$ would be set on the basis of the information derived from the synchronization word, while the next frequency synchronization is done following this next slot, namely at instance $t_6$.

In accordance with embodiments, the instances at which a frequency synchronization is required for a node may be controlled dynamically inside the node, for example by determining inside the node a measure indicative of the drift of the local oscillator, for example by comparing the frequency on a regular or periodic basis to determine the drift thereof so that in case a predefined threshold is exceeded at the end of the current slot the frequency synchronization in accordance with the frequency offset information $\hat{\epsilon}_{ij}$ is done. In an alternative embodiment, this dynamic approach may be used in each node without providing a predefined and fixed "update interval" for frequency synchronization, rather each node determines the drift of the local oscillator and sets the respective instance in time at which a frequency synchronization is necessary dynamically.

The frequency offset information may be derived in a receiving node from the synchronization word, for example on the basis of information carried within the synchronization word being indicative of a frequency of the transmitting node. Knowing the time at which the synchronization word was sent the receiving node can determine the frequency offset between its local oscillator and the local oscillator of the transmitting node. Alternatively, the sync word may include data indicating the frequency of the oscillator of the transmitting node. In addition, the synchronization word may comprise two portions or two synchronization words may be received and from the two consecutive words the length of the slots is derived so that the frequency offset can be determined.

Thus, the approach of embodiments of the invention as discussed above is advantageous as it provides for a reliable starting time of each slot in a multi-node wireless communication network wherein the slots have a substantially constant duration so that even after a predetermined number of slots was transmitted/received, i.e. within the interval until the next synchronization word is received, for example every second, all slots terminate at substantially the same instance in time as is shown in FIG. 6.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A node in a wireless system, the wireless system using transmit/receive slots for a communication among the nodes in the wireless system, the node comprising:
a reception block, the reception block being configured to receive from a transmitting node in the wireless system a synchronization signal, and to derive from the synchronization signal a time offset and a frequency offset, between a first clock generator in the node and a second clock generator in the transmitting node;
a slot synchronization block including the first clock generator, the slot synchronization block being configured to update the first clock generator based on the derived time offset and the derived frequency offset, and
a transmission block configured to transmit data,
wherein the slot synchronization block is configured to set a slot start of a slot based on the derived time offset and to set a slot start of a subsequent slot based on the derived frequency offset,
wherein the first clock generator includes a digital oscillator, and wherein the slot synchronization block is configured to modify the phase of the clock signal of the digital oscillator for updating the first clock generator, and
wherein the slot synchronization block is configured to modify the phase of the clock signal of the digital oscillator by delaying incrementing the phase in accordance with a time offset to provide for the time synchronization, and to change a slope of the phase in accordance with the frequency offset to provide for the frequency synchronization.

2. The node of claim 1, wherein the slot synchronization block is configured to update the first clock generator for one or more of the subsequent slots based on the derived frequency offset.

3. The node of claim 1, wherein synchronization signals are received at the node at predefined time intervals,
wherein the start of a first slot following the receipt of the synchronization signal is updated on the basis of the derived time offset, and
wherein the start of at least one slot in the interval between subsequent synchronization signals is set based on the derived frequency offset.

4. The node of claim 3, wherein the start of each slot for a subset of slots in the interval between subsequent synchronization signals is set the based on the derived frequency offset.

5. The node of claim 3, wherein the start of the first node is further set based on the derived frequency offset.

6. The node of claim 1, wherein the node is configured to determine a frequency drift of its clock generator, and to determine on the basis of the frequency drift an interval between slots at which it is required to set the start of a slot based on the derived frequency offset.

7. The node of claim 1, wherein the reception block is configured to derive the frequency offset on the basis of frequency information about the second clock generator of the transmitting node in the synchronization signal.

8. The node of claim 1, wherein the synchronization signal comprises a plurality of portions received subsequently at the node, and wherein the reception block is configured to derive the frequency offset from the subsequent portions of the synchronization signal or from subsequent synchronization signals received at the node.

9. The node of claim 1, wherein the slot synchronization block is configured to update the first clock generator by correcting the frequency of the first clock generator by a correction term calculated from an existing correction term and an update function receiving the frequency offset as an input, the update function defining a frequency to which the first clock generator converges.

10. The node of claim 9, wherein the update function is a min/max function selecting for the update of the correction term a minimum or a maximum of the previously derived frequency offsets, thereby yielding a fast convergence towards the frequency of that clock generator in the wireless system that has the minimum frequency or maximum frequency, or an averaging function averaging all or a subset of the previously derived frequency offsets, thereby yielding a convergence towards an average frequency of the clock generators in the wireless system, or a function including a forgetting factor considering a subset of previously derived frequency offsets.

11. The node of claim 9, wherein the slot synchronization block is configured to weigh the update function by a scalar coupling factor, the scalar coupling factor being selected based on a desired time to converge or based on a topology of the wireless system.

12. The node of claim 11, wherein the slot synchronization block is configured to determine the frequency of the first clock generator according to the following equation, and to set the slope of the phase signal of a digital oscillator of the first clock generator in accordance with the determined frequency:

$$f_i(t) = \frac{d\phi_i(t)}{dt} = f_n + f_{d,i}(t) + f_{c,i}(t)$$

where:

$\frac{d\phi_i(t)}{dt}$: frequency of clock $i$ $f_n$: nominal frequency $f_{d,i}(t)$: frequency drift $f_{c,i}(t)$: frequency correction wherein the correction term is updated each time a synchronization signal is received, and is calculated based on the estimated local offset:

$$f_{c,i}(t^+) = f_{c,i}(t) + \gamma \cdot g(\hat{\epsilon}_{ij})$$

where $t^+$ denotes a short time instant after the instant t at which the synchronization word was received, $\gamma$ is a scalar coupling factor, and g is the update function, and $\hat{\epsilon}_{ij}$ is the derived frequency offset.

13. A method for time and frequency synchronizing nodes in a wireless system, the wireless system using transmit/receive slots for a communication among the nodes of the wireless system, the method comprising:

receiving at a receiving node from a transmitting node in the wireless system a synchronization signal;

deriving from the synchronization signal a time offset and a frequency offset between clock generators a first clock generator in the receiving node and a second clock generator in the transmitting node; and updating the first clock generator of the receiving node based on the derived time offset and the derived frequency offset, wherein a slot start of a slot is set based on the derived time offset, and a slot start of a subsequent slot is set based on the derived frequency offset, wherein the first clock generator includes a digital oscillator, and wherein updating the first clock generator comprises modifying the phase of the clock signal of the digital oscillator, and wherein modifying the phase of the clock signal of the digital oscillator comprises delaying incrementing the phase in accordance with a time offset to provide for the time synchronization, and changing a slope of the phase in accordance with the frequency offset to provide for the frequency synchronization.

14. A computer program product comprising program code stored on a non-transitory machine readable carrier, the program code performing, when being executed on a computer or a node of a wireless system, a method for time and frequency synchronizing nodes in a wireless system, the wireless system using transmit/receive slots for a communication among the nodes of the wireless system, the method comprising:

receiving at a receiving node from a transmitting node in the wireless system a synchronization signal;

deriving from the synchronization signal a time offset and a frequency offset between a first clock generator in the receiving node and a second clock generator in the transmitting node; and updating the first clock generator of the receiving node based on the derived time offset and the derived frequency offset, wherein a slot start of a slot is set based on the derived time offset, and a slot start of a subsequent slot is set based on the derived frequency offset, wherein the first clock generator includes a digital oscillator, and wherein updating the first clock generator comprises modifying the phase of the clock signal of the digital oscillator, and wherein modifying the phase of the clock signal of the digital oscillator comprises delaying incrementing the phase in accordance with a time offset to provide for the time synchronization, and changing a slope of the phase in accordance with the frequency offset to provide for the frequency synchronization.

15. A node in a wireless system, the wireless system using transmit/receive slots for a communication among the nodes in the wireless system, the node comprising:

a reception block;

a slot synchronization block including a first clock generator; and a transmission block configured to transmit data;

wherein the reception block is configured to receive from a transmitting node in the wireless system a synchronization signal, and to derive from the synchronization signal a time offset and a frequency offset, between the first clock generator of the slot synchronization block and a second clock generator in the node and in the transmitting node, wherein the slot synchronization block is configured to update the first clock generator based on the derived time offset and the derived frequency offset, wherein synchronization signals are received at the node at predefined time intervals, wherein the start of a first slot following the receipt of the synchronization signal is updated on the basis of the derived time offset, and wherein in the interval between subsequent synchronization signals the start of one or more slots following the first slot is set based on the derived frequency offset.

16. A method for time and frequency synchronizing nodes in a wireless system, the wireless system using transmit/receive slots for a communication among the nodes of the wireless system, the method comprising:

receiving at a receiving node from a transmitting node in the wireless system a synchronization signal;

deriving from the synchronization signal a time offset and a frequency offset between a first clock generator in the receiving node and a second clock generator in the transmitting node; and updating the first clock generator of the receiving node based on the derived time offset and the derived frequency offset, wherein synchronization signals are received at the node at predefined time intervals, wherein the start of a first slot following the receipt of the synchronization signal is updated on the basis of the derived time offset, and wherein in the interval between subsequent synchronization signals the start of one or more slots following the first slot is set based on the derived frequency offset.

17. A computer program product comprising program code stored on a machine readable carrier, the program code performing, when being executed on a computer or a node of a wireless system, a method for time and frequency synchronizing nodes in a wireless system, the wireless system using transmit/receive slots for a communication among the nodes of the wireless system, the method comprising:

receiving at a receiving node from a transmitting node in the wireless system a synchronization signal;

deriving from the synchronization signal a time offset and a frequency offset between a first clock generator in the receiving node and a second clock generator in the transmitting node; and updating the first clock generator of the receiving node based on the derived time offset and the derived frequency offset, wherein synchronization signals are received at the node at predefined time intervals, wherein the start of a first slot following the receipt of the synchronization signal is updated on the basis of the derived time offset, and wherein in the interval between subsequent synchronization signals the start of one or more slots following the first slot is set based on the derived frequency offset.

* * * * *